United States Patent [19]

Mizutani et al.

[11] Patent Number: 4,840,827

[45] Date of Patent: Jun. 20, 1989

[54] CERAMIC HONEYCOMB STRUCTURAL BODIES AND METHOD OF PRODUCING THE SAME

[75] Inventors: Isao Mizutani; Toshihiko Hijikata; Takashi Harada, all of Nagoya, Japan

[73] Assignee: NGK Insulators, Ltd., Japan

[21] Appl. No.: 165,464

[22] Filed: Mar. 8, 1988

[30] Foreign Application Priority Data

Mar. 16, 1987 [JP] Japan .............................. 62-37125[U]

[51] Int. Cl.⁴ .............................................. B32B 3/12
[52] U.S. Cl. ....................................... 428/116; 156/89; 264/177.12; 428/188; 502/527
[58] Field of Search .................. 428/116, 188; 156/89; 502/527; 264/177.12

[56] References Cited

U.S. PATENT DOCUMENTS

| | | | |
|---|---|---|---|
| 3,876,556 | 4/1975 | Laack et al. | 502/1 |
| 3,938,232 | 2/1976 | Noda et al. | 156/89 X |
| 4,285,909 | 8/1981 | Mizusawa et al. | 422/179 |
| 4,448,833 | 5/1984 | Yamaguchi et al. | 428/116 |
| 4,451,517 | 5/1984 | Inoguchi et al. | 428/116 |
| 4,455,336 | 6/1984 | Ogawa et al. | 428/116 |

*Primary Examiner*—Henry F. Epstein
*Attorney, Agent, or Firm*—Arnold, White & Durkee

[57] ABSTRACT

An extrusion molded ceramic honeycomb structural body having a plurality of through-holes surrounded by partition walls, and a coating layer formed on an outer periphery wall of the main ceramic honeycomb structural body which has an outer diameter smaller than a predetermined dimension, whereby the coating layer provides the outer diameter of the structural body with an outer diameter having a predetermined dimensional tolerance.

16 Claims, 1 Drawing Sheet

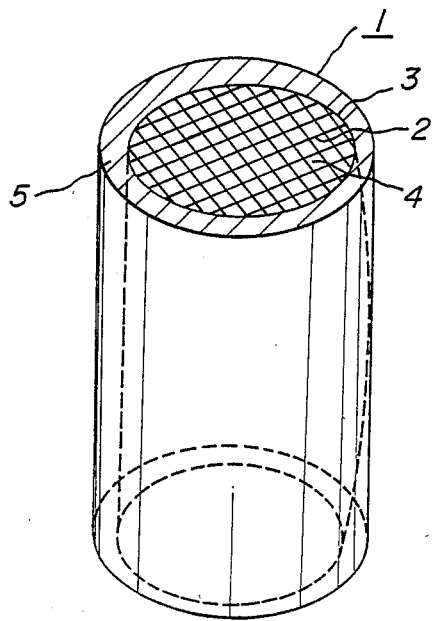

CERAMIC HONEYCOMB STRUCTURAL BODIES AND METHOD OF PRODUCING THE SAME

BACKGROUND OF THE INVENTION

1. Field of the Invention

This invention relates to a ceramic honeycomb structural body used as a catalyst carrier for purification of an exhaust gas expelled from an internal combustion engine for automobiles, a diesel particulate filter (hereinafter referred to as DPF), or a catalyst carrier for purification and/or deodorization of an exhaust gas using various gases or petroleum as a fuel and a method of producing the same.

2. Related Art Statement

Recently, catalyst convertors have been used for the purification of exhaust gas from an internal combustion engine in connection with the prevention of air pollution. In general, the catalyst convertor is manufactured by coating a honeycomb structural carrier of cordierite ceramic with an active substance having a large specific surface area such as γ-alumina and carrying a noble metal catalyst such as platinum, palladium, rhodium, or the like, on the γ-alumina layer to form a honeycomb structural catalyst carrier, airtightly inserting this carrier into a casing made from stainless steel or the like through a sealing member, and arranging the casing and carrier in a passage of an exhaust gas discharged from an internal combustion engine, wherein hydrocarbons, carbon monoxide, nitrogen oxide and the like included in the exhaust gas are reduced and purified on the catalyst bed of the honeycomb structural carrier.

Such a ceramic honeycomb structural carrier is manufactured through extrusion molding, drying and firing steps, but inevitable size errors and deformations occur in the ceramic honeycomb structure at each step. Firstly, the extrusion molded product contains water, binder and the like and is very soft at the extrusion molding step, so that it easily deforms by its dead weight. In large products of 300 mm in diameter, for example, if they are extruded in a direction perpendicular to gravity, cells existing in the outer peripheral portion of the product break down by its dead weight, while if they are extruded in a direction parallel to gravity, the lower portion of the product buckles by its dead weight. Secondly, the drying and/or firing of the extrusion molded product can not be carried out completely and uniformly at the drying and firing steps, so that scattering of shrinkage in various portions of a final product results. Therefore, the final product has a drawback that the accuracy of its outer diameter is somewhat poor and also the cylindricity of the final product is poor.

SUMMARY OF THE INVENTION

It is, therefore, an object of the present invention to provide a ceramic honeycomb structural body having a predetermined outer diameter and good cylindricity.

According to a first aspect of the invention, there is the provision of a ceramic honeycomb structural body having many through-holes surrounded by partition walls, comprising a main ceramic honeycomb structural body made through extrusion molding and having an outer diameter smaller than a predetermined dimension, and a coating layer formed on the outer peripheral wall of the main body so as to provide the body with an outer diameter having a predetermined dimensional tolerance.

According to a second aspect of the invention, there is the provision of a method of producing a ceramic honeycomb structural body, which comprises the steps of:

(a) extrusion-molding a main ceramic honeycomb structural body having a plurality of many through-holes;

(b) applying a ceramic material onto the outer peripheral wall of the main body to form a coating layer thereon so as to provide the main body with an outer diameter having a predetermined dimensional tolerance; and (c) firing the resulting coated main body.

According to a third aspect of the invention, there is the provision of a method of producing a ceramic honeycomb structural body, which comprises the steps of:

(a) extrusion-molding a main ceramic honeycomb structural body having a plurality of through-holes;

(b) firing the main body; and (c) applying a ceramic material onto the outer peripheral wall of the fired main body to form a coating layer thereon so as to provide the main body with an outer diameter having a predetermined dimensional tolerance.

BRIEF DESCRIPTION OF THE DRAWING

The invention will be described with reference to the accompanying drawing, wherein:

A single FIGURE is a perspective view of an embodiment of the ceramic honeycomb structural body according to the invention.

DESCRIPTION OF THE PREFERRED EMBODIMENTS

According to the invention, the coating layer compensating the difference between the predetermined dimensional tolerance and the actual outer diameter of the main ceramic honeycomb structural body is locally or wholly arranged onto the outer peripheral wall of the main body having an outer diameter smaller than the predetermined dimension, whereby not only the outer peripheral wall is reinforced but also the outer diameter thereof can be corrected into a predetermined dimensional tolerance.

Heretofore, when the ceramic honeycomb structural body is airtightly inserted into a casing for the catalyst carrier or DPF in the internal combustion engine through a sealing member or a cushioning member for preventing gas leakage and damping vibrations, if the dimensional accuracy of the ceramic honeycomb structural body is poor, there have been adopted some countermeasures for compensating a difference between the actual size and the predetermined dimensional tolerance of the structural body. Such measures include changing the thickness of the sealing or cushioning members, use of thickened sealing or cushioning member and the like for putting the sealing or cushioning member within a constant surface pressure range. However, according to the invention, the dimensional accuracy of the structural body is good as mentioned above, so that a relatively thin sealing or cushioning member having a constant thickness can be used and the economical merit is improved.

Furthermore, when the ceramic honeycomb structural main body is formed by extrusion molding, wavy fine unevenness is generally produced on the outer peripheral wall of the main body in the extrusion direction. According to the invention, such a fine unevenness is buried with the coating layer to thereby make the surface of the main body smooth and consequently the performance for sealing gas is considerably improved.

The invention will be described with reference to the following embodiment.

As shown in the single FIGURE, a ceramic honeycomb structural body 1 is obtained by extrusion-molding a cordierite material and comprises partition walls 2, an outer peripheral wall 3 and through-holes 4 defined by the partition walls 2. The sectional form of the through-hole 4 is square in the illustrated embodiment but may take an arbitrary form such as polygonal form, e.g. hexagon or the like, circular, and ellipsoldal. Moreover, the term "through-hole" used herein includes a case that an end of the through-hole is plugged as in a DPF.

The ceramic honeycomb structural body 1 according to the invention is provided with a coating layer 5 after the drying or firing as described in the following examples. (The coating layer is exaggeratedly shown in the single FIGURE.)

EXAMPLE 1

A cordierite material was extrusion-molded and dried to obtain a ceramic honeycomb structural main body having a rib thickness of 0.3 mm, a cell density of 46.5 cells/cm$^2$, a maximum outer diameter of 102 mm, a length of 103 mm and a roundness of 0.7 mm. Then, the main body was placed in a cylinder having an inner diameter of 103±0.1 mm and a height of 103 mm, and a cordierite slurry was poured into a space between the outer peripheral surface of the main body and the inner peripheral surface of the cylinder and dried to form a dried honeycomb structural body having a maximum outer diameter of 102.5 mm, a length of 103 mm and a roundness of 0.1 mm. Next, the dried body was fired at 1,300°~1,470° C. to obtain a ceramic honeycomb structural body having a maximum outer diameter of 99.9 mm, a length of 100 mm and a roundness of 0.4 mm. In this ceramic honeycomb structural body, fine unevenness was not observed in the outer peripheral wall thereof.

EXAMPLE 2

The same procedure as in Example 1 was repeated to obtain a ceramic honeycomb structural main body having a rib thickness of 0.17 mm, a cell density of 62 cells/cm$^2$, a maximum outer diameter of 99 mm, a length of 100 mm and a roundness of 0.8 mm. Then, this main body was fired and placed in a cylinder having an inner diameter of 101±0.1 mm and a height of 100 mm, and a cordierite slurry was poured and dried to obtain a ceramic honeycomb structural body having a maximum outer diameter of 100.1 mm and a roundness of 0.2 mm. The fine unevenness was not observed in the outer peripheral wall of the structural body.

In order to measure the mechanical strength of the resulting ceramic honeycomb structural body, aluminum plates of 100 mm in diameter and 20 mm in thickness were fitted to upper and lower end faces of the structural body and the side face of the structural body was air-tightly enclosed with a urethane sheet of 0.5 mm in thickness, which was placed in a pressure vessel filled with water. Then, a pressure inside the vessel was gradually raised to measure a pressure value producing the destructive sound (which was called as "isostatic strength"). In the ceramic honeycomb structural body of Example 2, the pressure value was 30 kgf/cm$^2$, which was improved by about two times as compared with the ceramic honeycomb structural body having no coating layer (whose pressure value was 13 kgf/cm$^2$).

EXAMPLE 3

To the same fired cordierite honeycomb structural body as in Example 2 was applied a mortar of alumina cement, which was then dried and machined to obtain a ceramic honeycomb structural body having a maximum outer diameter of 100 mm and a roundness of 0.1 mm.

EXAMPLE 4

A large fired cordierite honeycomb structural body for DPF having a rib thickness of 0.43 mm, a cell density of 15.5 cells/cm$^2$, an upper maximum outer diameter of 298 mm, a lower maximum outer diameter of 302 mm, a whole length of 355 mm and a roundness of 4.1 mm was coated with a mortar of alumina cement so as to provide an outer diameter of about 310 mm, and dried to obtain a dried product having an outer diameter of 305±0.3 mm. The dried product was machined to obtain a ceramic honeycomb structural body having roundnesses at upper and lower portions of 0.2 mm and 0.4 mm, respectively.

As described in the above example, in order to obtain products having a good outer diameter, roundness or profile of a surface, it is preferable that the ceramic honeycomb structural main body is previously produced at a size smaller than the predetermined dimensional tolerance and then the coating layer is provided at the outer peripheral portion of the main body so as to put the outer diameter into the predetermined dimensional tolerance. As the material for the coating layer, it is favorable to use the same material as in the main body or a material containing a small amount of the same material as in the main body and having a thermal expansion coefficient similar to that of the main body. Furthermore, it is preferable to conduct the coating after the firing from a viewpoint of dimensional acuracy and cost, but the coating layer may be peeled off from the ceramic honeycomb structural main body when thermal shock is strong because the main body is not integrally united with the coating layer. On the other hand, when the main body is coated with the coating material and then fired, the peeling is not caused through thermal shock, but the main body is apt to be subjected to a deformation during the firing and consequently the dimensional accuracy of the resulting ceramic honeycomb structural body is somewhat poor. When the fired body is refired after the coating, the peeling is not caused and the dimensional accuracy is good, but the cost becomes undesirably high. Therefore, it is necessary to select the above three coating methods in accordance with the use purpose.

Although the invention has been described with respect to the above examples, it may be subjected to various modifications and changes without departing from the scope of the invention. For instance, the structural body is cylindrical in the illustrated embodiment but may be ellipsoidal or the like. As the ceramic material, other ceramic materials may be used in addition to the cordierite. The coating layer is not necessarily formed over the whole periphery of the main body and may be formed only over a portion of the main body. Moreover, the coating layer may be formed before or after the catalyst is deposited on the main body.

As mentioned above, according to the invention, the ceramic honeycomb structural body has a predetermined outer diameter and cylindricity and is good in dimensional accuracy, so that when this structural body is applied to a catalyst apparatus for an exhaust gas, an apparatus for purification of exhaust gas and the like, a relatively thin sealing member having a constant thickness can be used, which becomes economical. Furthermore, fine unevenness produced on the outer peripheral wall of the main body at the extrusion molding step is buried with the coating layer to make the surface of the structural body smooth, whereby the performance for sealing gas is improved.

What is claimed is:

1. A ceramic honeycomb structural body having a plurality of longitudinal channels formed therein by a plurality of intersecting longitudinal partition walls, comprising an extrusion molded main ceramic honeycomb structural body having an outer diameter smaller than a predetermined dimension, and a coating layer formed on an outer periphery of said main body, so as to provide said main body with an outer diameter having a dimension within a predetermined dimensional tolerance of said predetermined dimension.

2. A ceramic honeycomb structural body according to claim 1, wherein said coating layer has a thermal expansion coefficient equal to that of said main ceramic honeycomb structural body.

3. A ceramic honeycomb structural body according to claim 1, wherein said coating layer is the same material as said main body.

4. A ceramic honeycomb structural body according to claim 1, wherein said ceramic honeycomb structural body comprises cordierite.

5. A method of producing a ceramic honeycomb structural body, comprising the steps of:
    (a) extrusion-molding a main ceramic honeycomb structural body having a plurality of longitudinal channels formed therein by a plurality of intersecting longitudinal partition walls and having an outer diameter smaller than a predetermined dimension;
    (b) applying a ceramic material on to an outer periphery of said main body, so as to form a coating layer thereon and provide said main body with an outer diameter having a dimension within a predetermined dimensional tolerance of said predetermined dimension; and
    (c) firing the resulting coated main body.

6. A method according to claim 5, wherein said ceramic material is applied to said main body after said main body is placed in a cylinder having a predetermined inner diameter.

7. A method according to claim 5, wherein said ceramic material has a thermal expansion coefficient equal to that of said main ceramic honeycomb structural body.

8. A method according to claim 5, wherein said ceramic material is the same material as said main body.

9. A method according to claim 5, wherein said main ceramic honeycomb structural body comprises cordierite.

10. A method of producing a ceramic honeycomb structural body, comprising the steps of:
    (a) extrusion-molding a main ceramic honeycomb structural body having a plurality of longitudinal channels formed therein by a plurality of intersecting longitudinal partition walls and having an outer diameter smaller than a predetermined dimension;
    (b) firing the main body; and
    (c) applying a ceramic material on to an outer periphery of said fired main body, so as to form a coating layer thereon and provide said main body with an outer diameter having a dimension within a predetermined dimensional tolerance of said predetermined dimension.

11. A method according to claim 10, wherein said ceramic material is applied to said main body after said main body is placed in a cylinder having a predetermined inner diameter.

12. A method according to claim 10, wherein said ceramic material has a thermal expansion coefficient equal to that of said main ceramic honeycomb structural body.

13. A method according to claim 10, wherein ceramic material is the same material as said main body.

14. A method according to claim 10, wherein said ceramic honeycomb structural body comprises cordierite.

15. A method according to claim 10, wherein said coating layer is further subjected to a firing treatment.

16. A method according to claim 10, wherein said coating layer is further matured.

* * * * *